United States Patent
Hu et al.

(10) Patent No.: US 10,411,502 B2
(45) Date of Patent: Sep. 10, 2019

(54) UPS CIRCUIT

(71) Applicant: EATON MANUFACTURING LP, GLASGOW, SUCCURSALE DE MORGES, Morges (CH)

(72) Inventors: Shuangping Hu, Shenzhen (CN); Huoyuan Cai, Shenzhen (CN); Yun Ma, Shenzhen (CN)

(73) Assignee: Eaton Intelligent Power Limited (IE)

( * ) Notice: Subject to any disclaimer, the term of this patent is extended or adjusted under 35 U.S.C. 154(b) by 347 days.

(21) Appl. No.: 15/119,298

(22) PCT Filed: Jan. 23, 2015

(86) PCT No.: PCT/CN2015/071378
§ 371 (c)(1),
(2) Date: Aug. 16, 2016

(87) PCT Pub. No.: WO2015/127843
PCT Pub. Date: Sep. 3, 2015

(65) Prior Publication Data
US 2017/0012465 A1    Jan. 12, 2017

(30) Foreign Application Priority Data
Feb. 27, 2014 (CN) .......................... 2014 1 0069076

(51) Int. Cl.
*H02J 9/06* (2006.01)
*H02J 7/00* (2006.01)
*H02J 9/04* (2006.01)

(52) U.S. Cl.
CPC ............. *H02J 9/061* (2013.01); *H02J 7/007* (2013.01); *H02J 9/04* (2013.01)

(58) Field of Classification Search
CPC ............... H02J 9/061; H02J 7/007; H02J 9/04
See application file for complete search history.

(56) References Cited

U.S. PATENT DOCUMENTS 4,307,332 A * 12/1981 Lorenzo .................. G05F 1/563
                                                     323/241
6,269,012 B1 * 7/2001 Kusakabe ............. H02M 7/217
                                                     323/239
(Continued)

FOREIGN PATENT DOCUMENTS

CN    1169617    1/1998
CN    1284777    2/2001
(Continued)

OTHER PUBLICATIONS

International Search Report Corresponding to International Application No. PCT/CN2015/071378; dated Apr. 29, 2015; 3 Pages.
(Continued)

*Primary Examiner* — Jared Fureman
*Assistant Examiner* — Michael J Warmflash
(74) *Attorney, Agent, or Firm* — Stanek Lemon Crouse & Meeks, P.A.

(57) ABSTRACT

A UPS circuit, comprising a low frequency transformer (TX) and a battery (B), the low frequency transformer (TX) comprising a primary side winding, and a secondary side winding connected to the battery (B); the primary side winding is connected to a municipal power loop via a switching device (SW), and the switching device (SW) can operate in a chopping mode.

17 Claims, 2 Drawing Sheets

(56) References Cited

U.S. PATENT DOCUMENTS

| | | | | |
|---|---|---|---|---|
| 6,348,782 B1* | 2/2002 | Oughton, Jr. | ........... | H02J 9/062 307/46 |
| 8,212,402 B2* | 7/2012 | Rodenhiser | ............. | H02J 9/062 307/64 |
| 2006/0238031 A1* | 10/2006 | Frey | ........................ | H02J 9/061 307/64 |
| 2013/0002028 A1* | 1/2013 | Yu | ........................... | H02J 9/062 307/66 |

FOREIGN PATENT DOCUMENTS

| | | |
|---|---|---|
| CN | 1321351 | 11/2001 |
| CN | 102291014 | 12/2011 |
| JP | 2005176460 | 6/2005 |

OTHER PUBLICATIONS

Extended European Search Report, EP Application No. 15754520.3, dated Sep. 26, 2017, 8 pages.

* cited by examiner

UPS CIRCUIT

RELATED APPLICATIONS

The present application is a 35 U.S.C. § 371 national phase application of PCT International Application No. PCT/CN2015/071378, having an international filing date of Jan. 23, 2015, claiming priority to Chinese Patent Application No. 201410069076X filed Feb. 27, 2014. The disclosures of each application are incorporated herein by reference in their entireties. The above PCT International Application was published in the Chinese language as International Publication No. WO 2015/127843.

TECHNICAL FIELD

The present invention relates to a UPS circuit and, more particularly, to a UPS circuit comprising a low frequency transformer.

BACKGROUND OF THE INVENTION

A UPS (Uninterruptible Power System) is an alternating current power supply with an energy storage device, which provides uninterruptible power supply to a load using the energy storage device such as a battery during power failures. When the mains power supply is available, the UPS regulates the mains power supply and supplies it to the load. When the mains power supply is not available (power failure), the UPS supplies alternating currents to the load using the energy storage device, so as to keep the load working normally and prevent the software and hardware of the load from damage.

FIG. 1 shows a basic circuit configuration of the UPS, which comprises an input end $T_{in}$ receiving an AC power from the mains power supply and an output end $T_{out}$ supplying the AC power to the load. There are an electromagnetic interference filter EMI, switches SW1, SW2, SW3 and SW4, and a low frequency transformer TX between the input end $T_{in}$ and the output end $T_{out}$. In the mains power supply mode, SW3 and SW4 are closed, and the AC power is delivered from the input end $T_{in}$ to the output end $T_{out}$. At the same time, the AC power is delivered from a secondary side of the low frequency transformer TX to a circuit module AD for realizing AC/DC conversion. The circuit module AD rectifies the AC power into a DC power and then charges a battery B. When the mains power supply is not available and the UPS works in the battery mode, the circuit module AD works in inverter mode, and converts the DC power provided by the battery B into the AC power and provides the AC power to the secondary side of the transformer TX. A primary side of the TX provides the AC power to the output end $T_{out}$ of the UPS circuit. The switches SW1 and SW2 are used to regulate the mains power supply voltage when it is too high or too low.

However, the efficiency requirements to the UPS have become increasingly higher with the proposition of environmental protection strengthening, in particular EPA Energy star. This type of UPS circuit has a big energy loss, which makes it difficult to meet the Energy star standard.

In the mains power supply mode, the UPS has a big self-loss even in a fully charged state. The loss mainly comprises: 1) an overall circuit conduction energy loss and a mains power supply components loss; 2) a loss for keeping the whole control system and the switching components operating; 3) an excitation loss of the low frequency transformer. Wherein, the excitation loss accounts for over 60% of the total no-load loss, and thus is the main cause of the no-load loss.

Core materials with lower magnetic losses may be used to reduce the excitation loss of the low frequency transformer. However, the cost is higher and the effect is limited. Another method to reduce the excitation loss is to disconnect the low frequency transformer from the mains power supply circuit in the mains power supply mode. In theory, in the mains power supply mode, if the battery B has been fully charged, the low frequency transformer does not need to power the battery B and disconnecting the low frequency transformer will not affect the UPS circuit. In practice, however, the battery has a self-discharge effect and the electrical energy stored therein will be drained slowly even if the battery does not power the load. In addition, some control circuits need to get a small amount of electrical energy from the battery. Consequently, the low frequency transformer is needed to charge the battery continuously. The method of disconnecting the low frequency transformer can completely eliminate the excitation loss of the low frequency transformer, but it is needed to get some energy from the mains power supply in consideration of the control circuits and the self-discharge of the battery. Therefore, an additional independent power supply is required to provide the energy, which causes a higher production cost.

SUMMARY OF INVENTION

In view of the foregoing, an object of the present invention is to provide a UPS circuit for avoiding the drawbacks of the prior art.

The present invention provides a UPS circuit comprising a low frequency transformer and a battery, wherein the low frequency transformer comprises a primary side winding and a secondary side winding connected to the battery, and wherein the primary side winding is connected to a mains power supply via a switch device (SW) which can operate in a chopping mode.

Preferably, the secondary side winding can be connected to the battery via a circuit module for realizing AC/DC conversion.

Preferably, the switch device further has a turn-on mode, and the switch device operates in the turn-on mode when the battery is being charged.

Preferably, the switch device can be chosen to operate in the chopping mode after the battery is fully charged.

Preferably, the switch device is turned on intermittently when it is in the chopping mode.

Preferably, the switch device is turned on and turned off periodically when it is in the chopping mode.

Preferably, a period with which the switch device is turned on and turned off is the same as a period of the voltage input into the UPS circuit.

Preferably, the switch device is turned on and turned off aperiodically.

Preferably, the secondary side winding comprises a first sub-winding and a second sub-winding, and the first sub-winding and the second sub-winding are connected to the battery via an inverter circuit module and a rectifier circuit module respectively.

In the UPS circuit comprising a low frequency transformer of the present invention, a switch SW is configured between the primary side winding of the low frequency transformer and the mains power supply, and can be turned on intermittently. Therefore, the excitation loss of the low frequency transformer and thus the overall energy loss of the UPS circuit may be greatly reduced while meeting the power demands of the battery B and the control circuit.

BRIEF DESCRIPTION OF DRAWINGS

The present invention will be further explained in combination with the embodiments with reference to the accompanying figures, wherein.

DESCRIPTION OF EMBODIMENTS

In the following parts, the present invention will be described in greater details with reference to the embodiments and the accompanying drawings so as to make its objects, solutions and advantages clearer. It should be understood that the specific embodiments described herein only intend to interpret the present invention, without making any limitation thereto.

Figure 1:
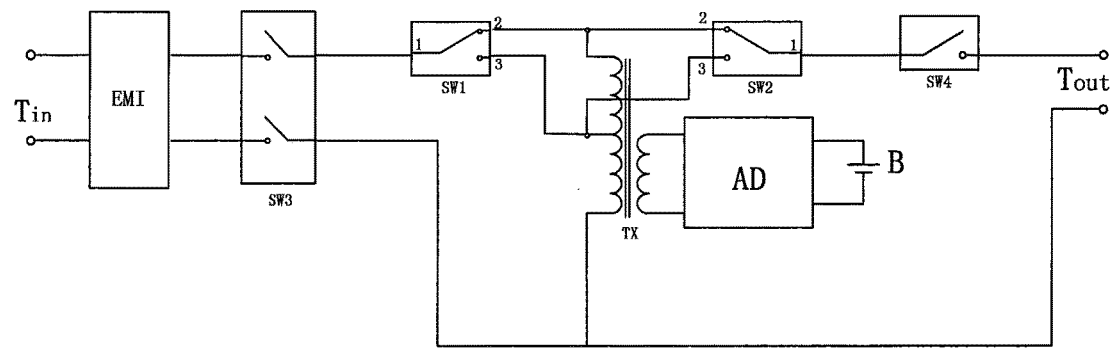
FIG. 1 is a schematic diagram of a prior art UPS circuit.
Figure 2:
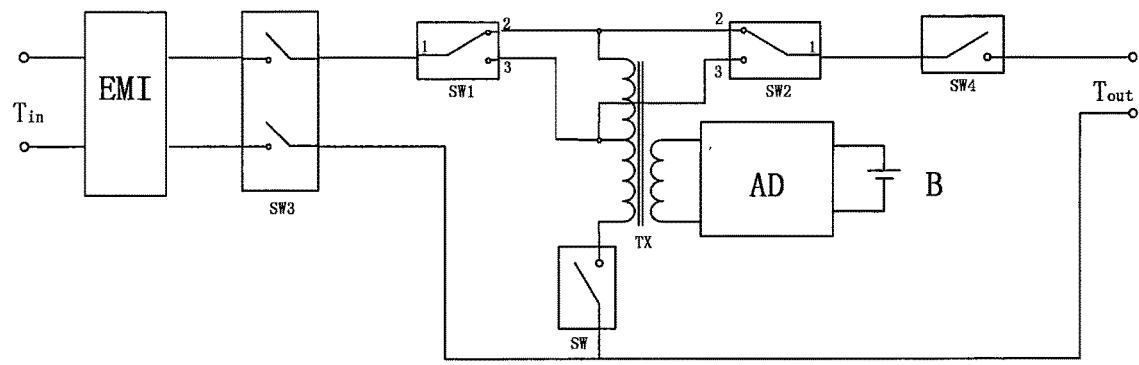
FIG. 2 is a schematic diagram of a UPS circuit according to one embodiment of the present invention.

The embodiment provides a UPS circuit, the structure of which is shown in FIG. 2, comprising an input end $T_{in}$ receiving an AC power from a mains power supply and an output end $T_{out}$ supplying the AC power to a load. There are an electro-magnetic interference filter EMI, switches SW1, SW2, SW3 and SW4, and a low frequency transformer TX between the input end $T_{in}$ and the output end $T_{out}$. Wherein, the switch SW3 is used to disconnect the low frequency transformer TX from the mains power supply when the UPS supplies power to the output end $T_{out}$ with a battery B thereof. The switches SW1 and SW2 cooperate with each other to regulate the mains power supply voltage when the mains power supply voltage is too high or too low.

When the mains power supply voltage is normal, contacts 1 and 2 of SW1 are connected, and contacts 1 and 2 of SW2 are connected too, as shown in FIG. 2. When the mains power supply voltage is too high, contacts 1 and 2 of SW1 are connected, and contacts 1 and 3 of SW2 are connected, so as to make buck regulation. When mains power supply voltage is too low, contacts 1 and 3 of SW1 are connected, and contacts 1 and 2 of SW2 are connected, so as to make boost regulation. The switch SW4 is used as an output switch of the UPS for controlling whether the UPS should supply power to the load. A secondary side of the low frequency transformer TX is connected to the battery B via a circuit module AD for realizing AC/DC conversion. During charging, the circuit module AD for realizing AC/DC conversion rectifies an AC power output from the secondary side of the low frequency transformer TX into a DC power and then charges the battery B. When the power of the battery B is needed, the circuit module AD works in an inverter mode and converts the DC power from the battery B into the AC power. The AC power is then provided to the secondary side of the low frequency transformer TX and thus to the output end $T_{out}$ of the UPS. A primary side of the low frequency transformer TX is connected to the mains power supply, namely the input end $T_{in}$ of the UPS circuit, via a switch SW.

Figure 3:
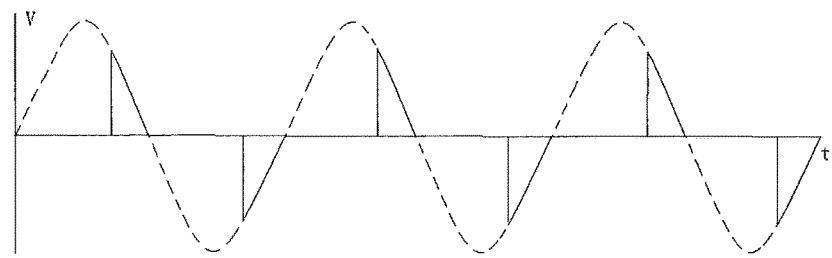
FIG. 3-FIG. 5 show three waveforms of a voltage input into a low frequency transformer TX.
Figure 4:
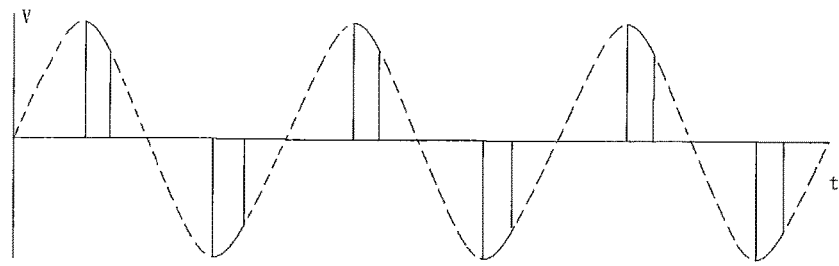
Figure 5:
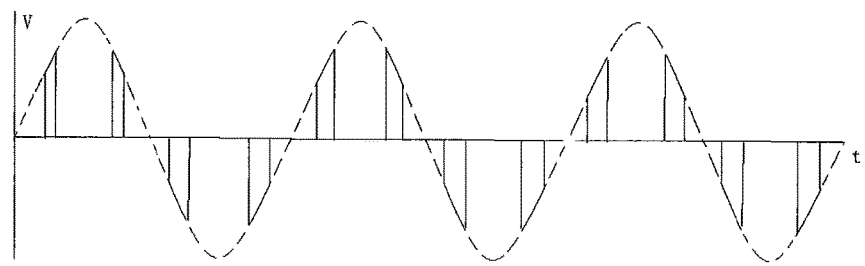

The switch SW has a turn-on mode and a chopping mode. In the turn-on mode, the switch SW is always in a turn-on state. And in the chopping mode, the switch SW can continuously alternate between a turn-on state and a turn-off state, so as to control the waveform of the voltage input into the low frequency transformer TX to reduce the voltage-time product of the low frequency transformer TX. FIGS. 3-5 show the waveforms of the voltage input into the low frequency transformer TX when the switch SW continuously and repeatedly alternates between the turn-on state and the turn-off state. The sine waves in FIGS. 3-5 are waveforms of the voltage from the mains power supply to the low frequency transformer TX, wherein the solid line parts indicate the time periods during which the switch SW is turned on, and the dashed line parts indicate the time periods during which the switch SW is turned off.

When the UPS is just started, the switch SW works in the turn-on mode. Now the mains power supply charges the battery B via the low frequency transformer TX and the circuit module AD while supplying power to the output end $T_{out}$ via the input end $T_{in}$. When the battery B is fully charged, it does not need to be continuously charged from the mains power supply. Now, the switch SW is configured to work in the chopping mode so as to continuously and repeatedly alternate between the turn-on state and the turn-off state. That is, the switch SW is intermittently turned on. By this way, the self-discharge loss of the battery B can be complemented and the power demand of the control circuit can be met, and in the mean time, the voltage-time product input into the low frequency transformer TX can be reduced to reduce the excitation loss thereof.

When the mains power supply is too high or too low, and it is needed to make SW1 and SW2 cooperate with each other to regulate the mains power supply voltage, the switch SW is configured to work in the turn-on mode so as to make the primary side winding of the low frequency transformer realize boost and buck.

In addition, FIGS. 3-5 only show three exemplary waveforms of the voltage input into the low frequency transformer TX, which are not limitation. A person skilled in the art may alter the waveform of the voltage input into the low frequency transformer TX based on actual demands. For example, a person skilled in the art may set the turn-on time periods and turn-on frequency of the switch SW according to the self-discharge rate of the battery B and the power demand of the control circuit.

Moreover, the UPS is usually powered by the mains power supply which is normally a sine wave, therefore the present invention is explained in FIGS. 3-5 by using the sine waves as examples. It should be appreciated that the UPS according to the present invention also applies to the power supply with other waveforms.

According to other embodiments of the present invention, the turn-on and turn-off of the switch SW can be periodic. That is, the turn-on time periods and turn-off time periods are alternative and constant. The turn-on and turn-off of the switch SW can also be aperiodic. That is, the turn-on time periods and turn-off time periods appear aperiodically. For the periodic turn-on and turn-off, the period for switching SW may be the same as or different from the period of the mains power supply sine wave.

Figure 6:
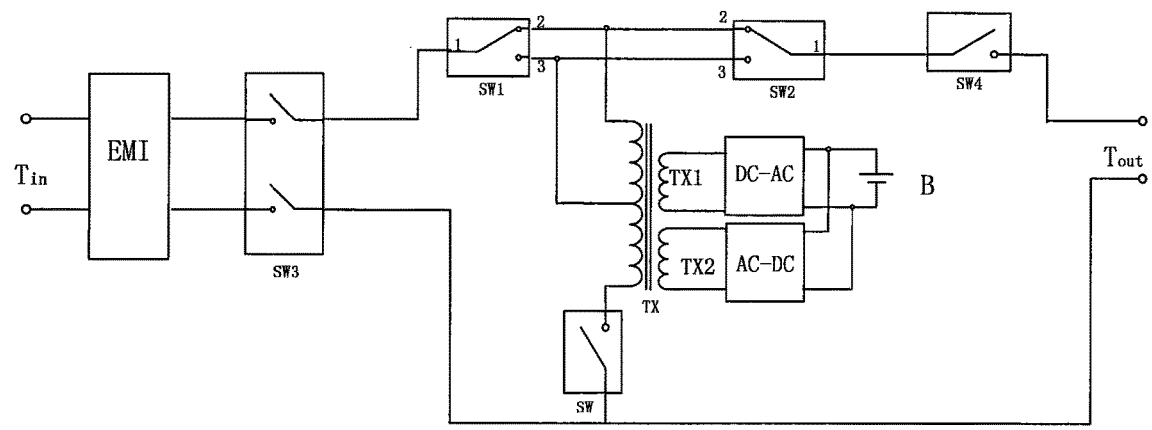
FIG. 6 is a schematic diagram of a UPS circuit according to another embodiment of the present invention.

According to other embodiments of the present invention, the low frequency transformer is not limited to the type described above. Other types of low frequency transformers can also be adopted by the solution of the present invention to reduce the excitation loss, such as the low frequency transformer with two secondary side windings shown in FIG. 6. The low frequency transformer shown in FIG. 6 comprises a first secondary side winding TX1 and a second secondary side winding TX2. The secondary side windings TX1 and TX2 are connected to the battery B via an inverter circuit module DC-AC and a rectifier circuit module AC-DC respectively. During charging, the low frequency transformer charges the battery B via the secondary side winding TX2 and the rectifier circuit module AC-DC. When needing the battery B to supply power, the inverter circuit module DC-AC converts the DC power from the battery B into the AC power and provides the AC power to the secondary side winding TX1 and thus to the output end $T_{out}$ of the UPS.

In the UPS circuit of the present invention, the switch SW may be various types of switches which can realize an intermittent turn-on. A person skilled in the art may choose the switch based on actual demands.

To sum up, the present invention provides a UPS circuit comprising a low frequency transformer, which is able to meet the power demands of the battery B and the control circuit and greatly reduce the excitation loss of the low frequency transformer by setting a switch SW between the primary side winding of the low frequency transformer and the mains power supply and making the switch SW turn on intermittently.

Embodiments of the present invention have been described in terms of the preferred embodiments, but the present invention is not limited to the embodiments described above, and various amendments and changes may be made within the scope of the present invention.

The invention claimed is:

1. An uninterruptible power supply (UPS) circuit comprising a transformer and a battery, wherein the transformer comprises a primary side winding having a first terminal configured to be connected to a first terminal of a mains power supply by a first switch and a secondary side winding connected to the battery, and wherein a second terminal of the primary side winding is intermittently connected to a second terminal of the mains power supply via a second switch in a chopping mode to intermittently charge the battery while the first switch continuously connects the first terminal of the mains power supply to the first terminal of the primary side winding.

2. The UPS circuit according to claim 1, wherein the secondary side winding is connected to the battery via a circuit module that provides AC/DC conversion.

3. The UPS circuit according to claim 1, wherein the second switch is on when the battery is being charged.

4. The UPS circuit according to claim 1, wherein the second switch operates in the chopping mode after the battery is fully charged.

5. The UPS circuit according to claim 1, wherein the second switch is turned on and turned off periodically in the chopping mode.

6. The UPS circuit according to claim 5, wherein a period with which the second switch is turned on and turned off is the same as a period of a voltage of the mains power supply.

7. The UPS circuit according to claim 1, wherein the second switch is turned on and turned off aperiodically in the chopping mode.

8. The UPS circuit according to claim 1, wherein the secondary side winding comprises a first sub-winding and a second sub-winding, and wherein the first sub-winding and the second sub-winding are connected to the battery via an inverter circuit module and a rectifier circuit module respectively.

9. A UPS comprising:
a transformer having a first winding and at least one second winding inductively, coupled to the first winding;
a first switching circuit configured to provide a first state that couples a first terminal of an input port of the UPS to a first terminal of an output port of the UPS, a second state that couples first and second terminals of the first winding to the first terminal of the input port and the first terminal of the output port, respectively, and a third state that couples the first and second terminals of the first winding to the first terminal of the output port and the first terminal of the input port, respectively;
at least one converter circuit coupled between the at least one second winding of the transformer and an energy storage device; and
a second switching circuit configured to intermittently couple a third terminal of the first winding to second terminals of the input and output ports to intermittently charge the energy storage device while the first switching circuit is in the first state and is continuously transferring power from the input port to the output port.

10. The UPS of claim 9, wherein the second state supports a voltage buck operation and wherein the third state supports a voltage boost operation.

11. The UPS of claim 9, wherein the second switching circuit maintains a continuous connection of the third terminal of the first winding to the second terminals of the input and output ports when the first switching circuit is in either of the second and third states.

12. The UPS of claim 9 wherein the second switching circuit connects the third terminal of the first winding to the second terminals of the input and output ports for a time sufficient to maintain a charge on the energy storage device when the first switching circuit is in the first state.

13. The UPS of claim 9, wherein the second switching circuit periodically connects the third terminal of the first winding to the second terminals of the input and output ports when the first switching circuit is in the first state.

14. The UPS of claim 9, wherein the first terminal of the first winding comprises a first end terminal of the first winding, wherein the second terminal of the first winding comprises a center terminal of the first winding, and wherein the third terminal of the first winding comprises a second end terminal of the first winding.

15. The UPS of claim 9, wherein the energy storage device comprises a battery.

16. The UPS of claim 9, wherein the at least one second winding comprises two second windings and wherein the at least one converter comprises two converters coupling respective ones of the two second windings to the energy storage device.

17. The UPS of claim 9:
wherein the first switching circuit comprises:
a first switch configured to selectively couple the first terminal of the input port to the first and second terminals of the first winding; and
a second switch configured to selectively couple the first terminal of the output port to the first and second terminals of the first winding; and
wherein the second switching circuit comprises a second switch configured to selectively couple the third terminal of the first winding to the second terminals of the input and output ports.

* * * * *